Sept. 9, 1941.　　　　　D. F. TAFT　　　　　2,255,133
PRETZEL DOUGHNUT CUTTER
Filed July 10, 1940
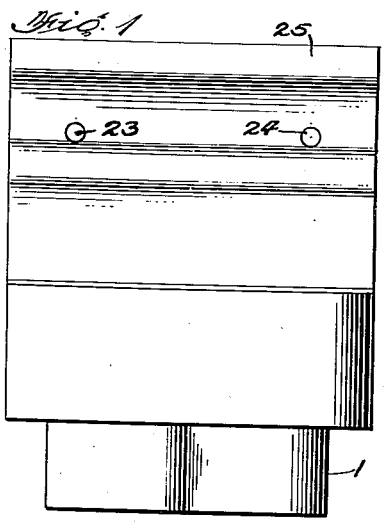
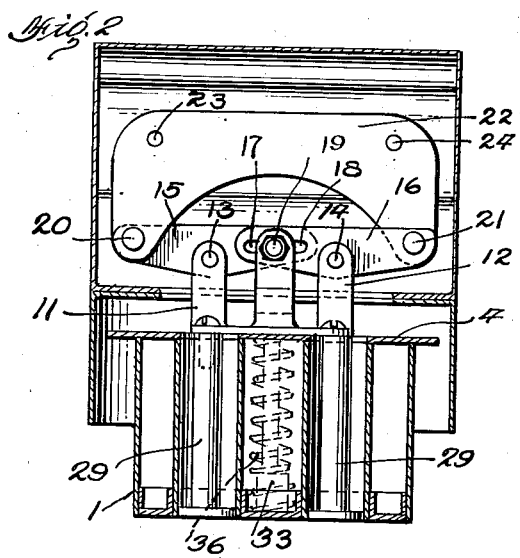
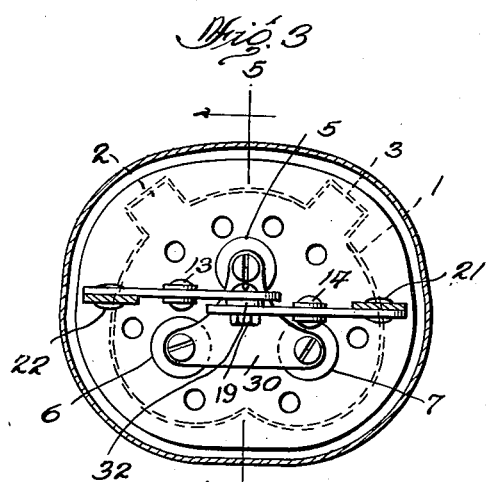
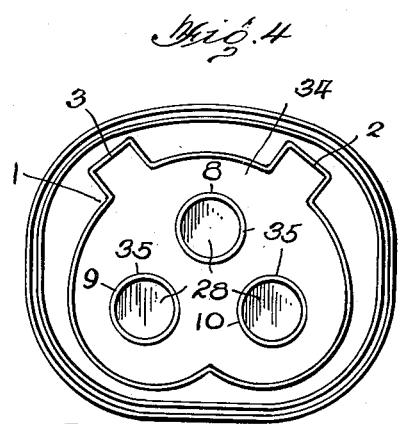
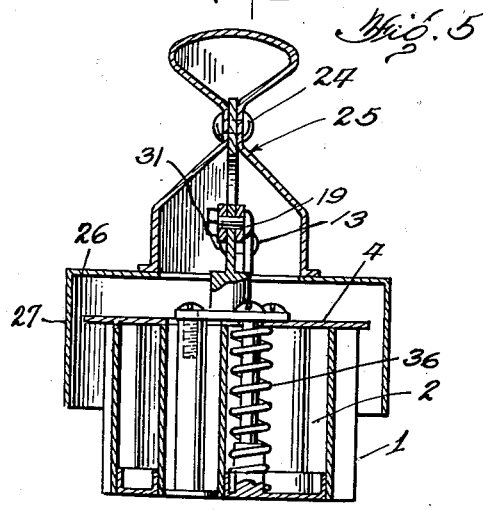
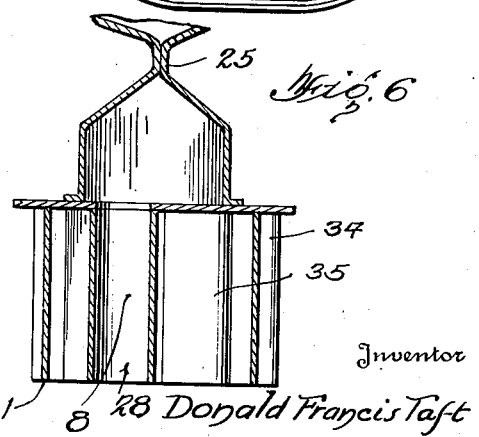
Inventor
Donald Francis Taft
By Francis H. Templeton
Attorney Patented Sept. 9, 1941

2,255,133

UNITED STATES PATENT OFFICE 2,255,133

PRETZEL DOUGHNUT CUTTER

Donald Francis Taft, Eugene, Oreg.

Application July 10, 1940, Serial No. 344,794

6 Claims. (Cl. 30—130)

This invention relates generally to cutters, and more particularly to devices for use in connection with the forming of dough preparatory to the cooking of the same as doughnuts and the like.

Various other objects and advantages of this invention will be obvious from the following particular description of an embodiment of my invention.

The various features of novelty which characterize my invention are pointed out with particularity in the claims, annexed to and forming a part of this specification, but for a better understanding of the invention, however, its advantages and specific objects attained with its use, reference should be had to the accompanying drawing and descriptive matter in which I have illustrated and described the best form of my invention.

In the accompanying drawing:

Fig. 1 is a side elevation of my cutter.

Fig. 2 is a vertical section taken through the cutter shown in Fig. 1.

Fig. 3 is a horizontal section taken through the cutter shown in Fig. 1.

Fig. 4 is a bottom view of the cutter shown in Fig. 2.

Fig. 5 is a vertical section on the line 5—5 of Fig. 3.

Fig. 6 is a vertical section through the cutter provided with no self-cleaning mechanism.

Referring to the drawing, a cutter shell 1, preferably formed of metal and of substantially heart-shape, has the metal of the shell bent outwardly to form a pair of projections 2 and 3.

With its bottom open as shown, the shell 1 has its top formed by a plate 4.

This plate 4 is provided with 3 apertures 5, 6 and 7, in which are respectively inserted tubes 8, 9 and 10, which have their lower edges in the plane of the bottom of the shell 1.

Projecting upwardly from the top plate 4 are a pair of spaced pillars or posts 11 and 12, to the tops of which are pivoted by pivots 13 and 14, links 15 and 16, which have their inner ends formed with slots 17 and 18 in which rides a pin 19.

The links 15 and 16 have their outer ends pivoted by pivots 20 and 21 to the outer ends of a plate 22 which is riveted by rivets 23 and 24 to the inside of a handle 25 bent to convenient shape and having its lower edges secured to the top 26 of an outer shell 27 that partially encloses the inner shell 1.

Slidable within tubes 8, 9 and 10, are piston-like discs or plungers 28, from the upper sides of which extend piston-like rods or posts 29 rigidly secured at their upper ends to the spaced ends of a triangular shaped plate 30, which is rigidly secured to an arm 31 pivoted on the pivot pin 19.

Centrally thereof, the top plate is provided with an opening 32 through which extends a post 33 having its upper end secured to the triangular plate 30 and extending downwardly through the opening 32 and having its lower end secured to the top face of a plate 34 which conforms to, and slides within, the heart-shaped shell 1. Such plate 34 has openings 35 in which slide the tubes 8, 9 and 10, and the post 33 is of such length as to position the plate 34 in the same plane with the discs 28 slidable within the tubes.

Surrounding the post 33 is a coil spring 36 having its upper end engaging the lower face of the top plate 4 and its lower end in engagement with the top face of plate 34.

In operation, when the shell 1 is pressed against the dough, the dough rises in and around the tubes and automatically forces the plate 34 and the plungers 28 upwardly within the shell 1, until the shell and tubes have cut through the dough. Thus, the upward movement of the discs or plungers with resulting compression of spring 36 and upward rocking of links 15 and 16 is caused by the pressure transmitted thereto by the dough within the tubes and shell, as such tubes and shell are pressed downward through the dough. Then upon releasing the downward pressure on the cutter, the spring 36, which was compressed by the downward movement of the cutter, expands and forces the plate 34 and plungers 28 downwardly and simultaneously pushes the dough out of the tubes and out of the space between the tubes and the shell. The resulting doughnut is substantially pretzel shape, thereby giving more efficiency in frying, and the dough, even though rich and tending to stick within the tubes and shell, is pushed simultaneously out of the tubes and also out of the space between the tubes and shell, thereby facilitating the rapid and efficient cutting of the dough into the desired form preparatory to frying or otherwise cooking the same.

While in accordance with the provisions of the statutes I have illustrated and described the best embodiment of my invention now known to me, it will be apparent to those skilled in the art that changes may be made in the subject matter and form of the invention disclosed without departing from the spirit of my invention as set forth in the appended claims, and that in some cases certain features of my invention may be used to advantage without a corresponding use of other features.

I claim:

1. In a device of the class described, a shell, a plurality of tubes secured within said shell, a disc slidable within each said tube, a plate slidable in the space between said tubes and said shell, a rod secured to each of said plate and said discs, a handle movable relative to said shell, links having their outer ends pivoted to said handle and their inner ends provided with slots in overlapping relation, a pin through said slots and means for connecting said rods to said pin.

2. In a device of the class described, a shell, a plurality of tubes secured within said shell, a disc slidable within each said tube, a plate slidable in the space between said shell and said tubes, means connecting the discs and the plate together for concurrent movement under influence of dough pressure when the cutter is manually pressed into dough and automatic means for returning the discs and plate to normal position to eject cut dough.

3. In a device of the class described, a shell, a plurality of tubes secured within said shell, a disc slidable within each said tube, a plate slidable in the space between said shell and said tubes, a handle movable relative to said shell, links having their outer ends pivoted to said handle and their inner ends in sliding relation to each other, and means for connecting said plates and discs to said inner ends of said links.

4. A device of the class described comprising a shell, a plurality of tubes secured within said shell, a disc slidable within each said tube, a plate slidable in the space between said shell and said tubes, a member movable relative to said shell and means including linkage between said member and said plate and discs for simultaneously reciprocating said plate and said discs relative to said member.

5. In a cutter, a shell cutter element comprising an elongated irregular shell member provided with a cutting edge on one end, a plurality of smaller cutter elements arranged within the first named cutter element and provided with cutting edges in a plane common to the cutting edge of the shell, yieldable ejector means positioned within the shell member, other yieldable ejector members positioned in the smaller cutters, means constraining all of the ejectors to yield concurrently under influence of pressing the cutting edges against dough, and spring means for returning the ejectors to substantially the plane of the cutting edges upon release of pressure.

6. In a cutter, a shell cutter element comprising an elongated shell member provided with a cutting edge on one end, a plurality of smaller cutter elements arranged within the first named cutter element and provided with cutting edges in a plane common to the cutting edge of the shell, yieldable ejector means positioned within the shell member, other yieldable ejector members positioned in the smaller cutters, means constraining all of the ejectors to yield concurrently under influence of pressing the cutting edges against dough and spring means for returning the ejectors to substantially the plane of the cutting edges upon release of pressure.

DONALD FRANCIS TAFT.